(12) United States Patent
Hirata et al.

(10) Patent No.: US 9,878,397 B2
(45) Date of Patent: Jan. 30, 2018

(54) SIC WAFER PRODUCING METHOD (71) Applicant: DISCO CORPORATION, Tokyo (JP)

(72) Inventors: Kazuya Hirata, Tokyo (JP); Yukio Morishige, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 0 days.

(21) Appl. No.: 15/397,386

(22) Filed: Jan. 3, 2017

(65) Prior Publication Data
US 2017/0197277 A1  Jul. 13, 2017

(30) Foreign Application Priority Data

Jan. 7, 2016  (JP) .................................. 2016-001941

(51) Int. Cl.
| | | |
|---|---|---|
| B23K 26/00 | (2014.01) | |
| B23K 26/06 | (2014.01) | |
| B28D 5/00 | (2006.01) | |
| B23K 26/53 | (2014.01) | |
| H01L 29/04 | (2006.01) | |
| H01L 29/16 | (2006.01) | |
| B23K 103/00 | (2006.01) | |

(52) U.S. Cl.
CPC ...... B23K 26/0057 (2013.01); B23K 26/0006 (2013.01); B23K 26/0626 (2013.01); B23K 26/0648 (2013.01); B23K 26/53 (2015.10); B28D 5/0011 (2013.01); *B23K 2203/56* (2015.10)

(58) Field of Classification Search
CPC . H01L 21/02; H01L 21/0208; H01L 21/0201; B23K 26/0057; B23K 26/0622; B23K 26/53; B23K 26/0006; B23K 3/56
See application file for complete search history.

(56) References Cited

U.S. PATENT DOCUMENTS

| | | | | |
|---|---|---|---|---|
| 9,620,415 B2* | 4/2017 | Hirata | ..................... | H01L 21/78 |
| 2003/0141505 A1* | 7/2003 | Isobe | ..................... | H01L 27/12 257/66 |
| 2012/0055546 A1* | 3/2012 | Turner | ................. | B23K 26/073 136/256 |
| 2012/0111495 A1* | 5/2012 | Shimoi | .............. | B23K 26/0057 156/250 |
| 2016/0052090 A1* | 2/2016 | Tanigawa | ........... | B23K 26/0624 219/121.69 |

(Continued)

FOREIGN PATENT DOCUMENTS

| | | |
|---|---|---|
| JP | 2000-094221 | 4/2000 |
| JP | 2013-049461 | 3/2013 |

*Primary Examiner* — Seahvosh Nikmanesh
(74) *Attorney, Agent, or Firm* — Greer Burns & Crain Ltd.

(57) ABSTRACT

A SiC wafer is produced from an SiC ingot having an end surface by setting the focal point of a laser beam at a predetermined depth from the end surface. The depth corresponds to the thickness of the SiC wafer to be produced. The laser beam is applied to the end surface of the SiC ingot while relatively moving the focal point and the SiC ingot to thereby form a modified layer parallel to the end surface and cracks extending from the modified layer, thus forming a separation start point. The separation start point is formed by setting the numerical aperture of a focusing lens to form the focal point to 0.45 to 0.9 and substantially setting the $M^2$ factor of the laser beam between 5 and 50 to thereby set the diameter of the focal point to 15 to 150 μm.

3 Claims, 12 Drawing Sheets

(56) References Cited

U.S. PATENT DOCUMENTS

2016/0093763 A1* 3/2016 Rana .................. B23K 26/0084
                                                        438/57
2017/0053829 A1* 2/2017 Hirata .................... H01L 21/78

* cited by examiner

SIC WAFER PRODUCING METHOD

BACKGROUND OF THE INVENTION

Field of the Invention

The present invention relates to a silicon carbide (SiC) wafer producing method for slicing an SiC ingot to produce an SiC wafer.

Description of the Related Art

Various devices such as integrated circuits (ICs) and large-scale integrations (LSIs) are formed in regions by forming a functional layer on the front side of a wafer formed of silicon or the like and partitioning this functional layer into the plurality of regions along a plurality of crossing division lines. The division lines of the wafer are processed by a processing apparatus such as a cutting apparatus and a laser processing apparatus to thereby divide the wafer into a plurality of individual device chips corresponding respectively to the devices. The device chips thus obtained are widely used in various electronic equipment such as mobile phones and personal computers.

Further, power devices or optical devices such as light-emitting diodes (LEDs) and laser diodes (LDs) are formed by forming a functional layer on the front side of a wafer formed of a hexagonal single crystal such as SiC and gallium nitride (GaN) and partitioning this functional layer into a plurality of regions along a plurality of crossing division lines. In general, the wafer on which the devices are to be formed is produced by slicing an ingot with a wire saw. Both sides of the wafer obtained above are polished to a mirror finish (see Japanese Patent Laid-open No. 2000-94221, for example).

This wire saw is configured in such a manner that a single wire such as a piano wire having a diameter of approximately 100 to 300 µm is wound around many grooves formed on usually two to four guide rollers to form a plurality of cutting portions spaced in parallel with a given pitch. The wire is operated to run in one direction or opposite directions, thereby slicing the ingot into a plurality of wafers. However, when the ingot is cut by the wire saw and both sides of each wafer are polished to obtain the product, 70% to 80% of the ingot is discarded to cause a problem of poor economy. In particular, a hexagonal single crystal ingot of SiC or GaN, for example, has high Mohs hardness and it is therefore difficult to cut this ingot with the wire saw. Accordingly, considerable time is required for cutting of the ingot, causing a reduction in productivity. That is, there is a problem in efficiently producing a wafer in this prior art.

A technique for solving this problem is described in Japanese Patent Laid-open No. 2013-49461. This technique includes the steps of setting the focal point of a laser beam having a transmission wavelength to SiC inside an SiC ingot, next applying the laser beam to the SiC ingot as scanning the laser beam on the SiC ingot to thereby form a modified layer and cracks in a separation plane inside the SiC ingot, and next applying an external force to the SiC ingot to thereby break the SiC ingot along the separation plane where the modified layer and the cracks are formed, thus separating a wafer from the SiC ingot.

In this technique, the laser beam is scanned spirally or linearly along the separation plane so that a first application point of the laser beam and a second application point of the laser beam nearest to the first application point have a predetermined positional relation with each other. As a result, the modified layer and the cracks are formed at very high density in the separation plane of the SiC ingot.

SUMMARY OF THE INVENTION

However, in forming a good modified layer inside the ingot, it is preferable to set the numerical aperture NA of a focusing lens to a large value of 0.45 to 0.9, thereby setting the depth of focus to 5 µm or less. As a result, the diameter of the focal point to be formed by the focusing lens is reduced to 1.5 to 3 µm. Accordingly, the spacing between the adjacent focal points must be set to approximately 10 µm to densely form the modified layer inside the ingot, causing a problem such that much time is required to result in low productivity. Conversely, when the numerical aperture NA of the focusing lens is reduced to thereby increase the diameter of the focal point, the depth of focus is increased to cause a problem such that the modified layer may be fluctuated in vertical position and it is accordingly difficult to form the modified layer in the same plane.

It is therefore an object of the present invention to provide an SiC wafer producing method which can efficiently produce an SiC wafer from an SiC ingot.

In accordance with an aspect of the present invention, there is provided an SiC wafer producing method for producing an SiC wafer from an SiC ingot having an end surface, including: a separation start point forming step of setting the focal point of a laser beam having a transmission wavelength to the SiC ingot inside the SiC ingot at a predetermined depth from the end surface, which depth corresponds to the thickness of the SiC wafer to be produced, and next applying the laser beam to the end surface of the SiC ingot as relatively moving the focal point and the SiC ingot to thereby form a modified layer parallel to the end surface and cracks extending from the modified layer, thus forming a separation start point; and a wafer separating step of separating a plate-shaped member having a thickness corresponding to the thickness of the SiC wafer from the SiC ingot at the separation start point after performing the separation start point forming step, thus producing the SiC wafer from the SiC ingot; the separation start point forming step including the steps of setting the numerical aperture of a focusing lens for forming the focal point to 0.45 to 0.9 and substantially setting the $M^2$ factor of the laser beam to 5 to 50 to thereby set the diameter of the focal point to 15 to 150 µm.

In accordance with another aspect of the present invention, there is provided an SiC wafer producing method for producing an SiC wafer from an SiC ingot having a first surface, a second surface opposite to the first surface, a c-axis extending from the first surface to the second surface, and a c-plane perpendicular to the c-axis, the SiC wafer producing method including: a separation start point forming step of setting the focal point of a laser beam having a transmission wavelength to the SiC ingot inside the SiC ingot at a predetermined depth from the first surface, which depth corresponds to the thickness of the SiC wafer to be produced, and next applying the laser beam to the first surface as relatively moving the focal point and the SiC ingot to thereby form a modified layer parallel to the first surface and cracks extending from the modified layer along the c-plane, thus forming a separation start point; and a wafer separating step of separating a plate-shaped member having a thickness corresponding to the thickness of the SiC wafer from the SiC ingot at the separation start point after performing the separation start point forming step, thus producing the SiC wafer from the SiC ingot; the separation start point forming step including a modified layer forming step of relatively moving the focal point of the laser beam in a first direction perpendicular to a second direction where the c-axis is inclined by an off angle with respect to a normal to the first surface and the off angle is formed between the first surface and the c-plane, thereby linearly forming the modified layer extending in the first direction; and an indexing step of relatively moving the focal point in the second direction to thereby index the focal point by a predetermined amount; the modified layer forming step including the steps of setting the numerical aperture of a focusing lens for forming the focal point to 0.45 to 0.9 and substantially setting the $M^2$ factor of the laser beam to 5 to 50 to thereby set the diameter of the focal point to 15 to 150 μm.

According to the SiC wafer producing method of the present invention, the separation start point forming step includes the steps of setting the numerical aperture of the focusing lens for forming the focal point to 0.45 to 0.9 and substantially setting the $M^2$ factor of the laser beam to 5 to 50 to thereby set the diameter of the focal point to 15 to 150 μm. Accordingly, although the depth of focus of the focusing lens is as shallow as 5 μm or less, a large-sized focal spot can be formed to thereby form a good separation start point efficiently and stably. Further, the productivity can be sufficiently improved and the amount of the ingot to be discarded can be sufficiently reduced.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
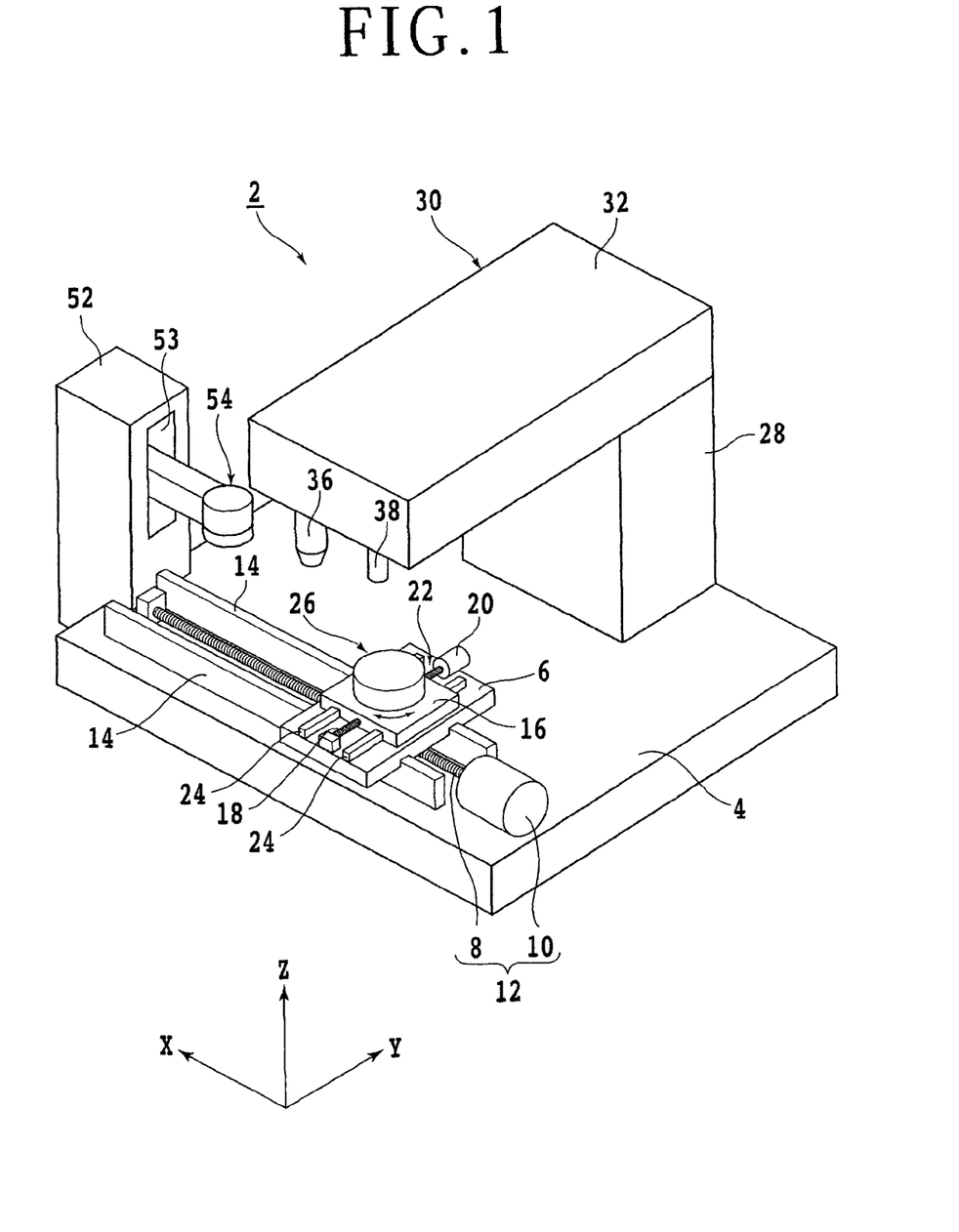
FIG. 1 is a perspective view of a laser processing apparatus suitable for use in performing the SiC wafer producing method of the present invention.

A preferred embodiment of the present invention will now be described in detail with reference to the drawings. Referring to FIG. 1, there is shown a perspective view of a laser processing apparatus 2 suitable for use in performing the SiC wafer producing method of the present invention. The laser processing apparatus 2 includes a stationary base 4 and a first slide block 6 mounted on the stationary base 4 so as to be movable in the X direction. The first slide block 6 is moved in a feeding direction, or in the X direction along a pair of guide rails 14 by a feeding mechanism 12 composed of a ball screw 8 and a pulse motor 10.

A second slide block 16 is mounted on the first slide block 6 so as to be movable in the Y direction. The second slide block 16 is moved in an indexing direction, or in the Y direction along a pair of guide rails 24 by an indexing mechanism 22 composed of a ball screw 18 and a pulse motor 20. A support table 26 is mounted on the second slide block 16. The support table 26 is movable in the X direction and the Y direction by the feeding mechanism 12 and the indexing mechanism 22 and also rotatable by a motor stored in the second slide block 16.

A column 28 is provided on the stationary base 4 so as to project upward therefrom. A laser beam applying mechanism (laser beam applying means) 30 is mounted on the column 28. The laser beam applying mechanism 30 is composed of a casing 32, a laser beam generating unit 34 (see FIG. 2) stored in the casing 32, and focusing means (laser head) 36 mounted on the front end of the casing 32. An imaging unit 38 having a microscope and a camera is also mounted on the front end of the casing 32 so as to be aligned with the focusing means 36 in the X direction.

Figure 2:
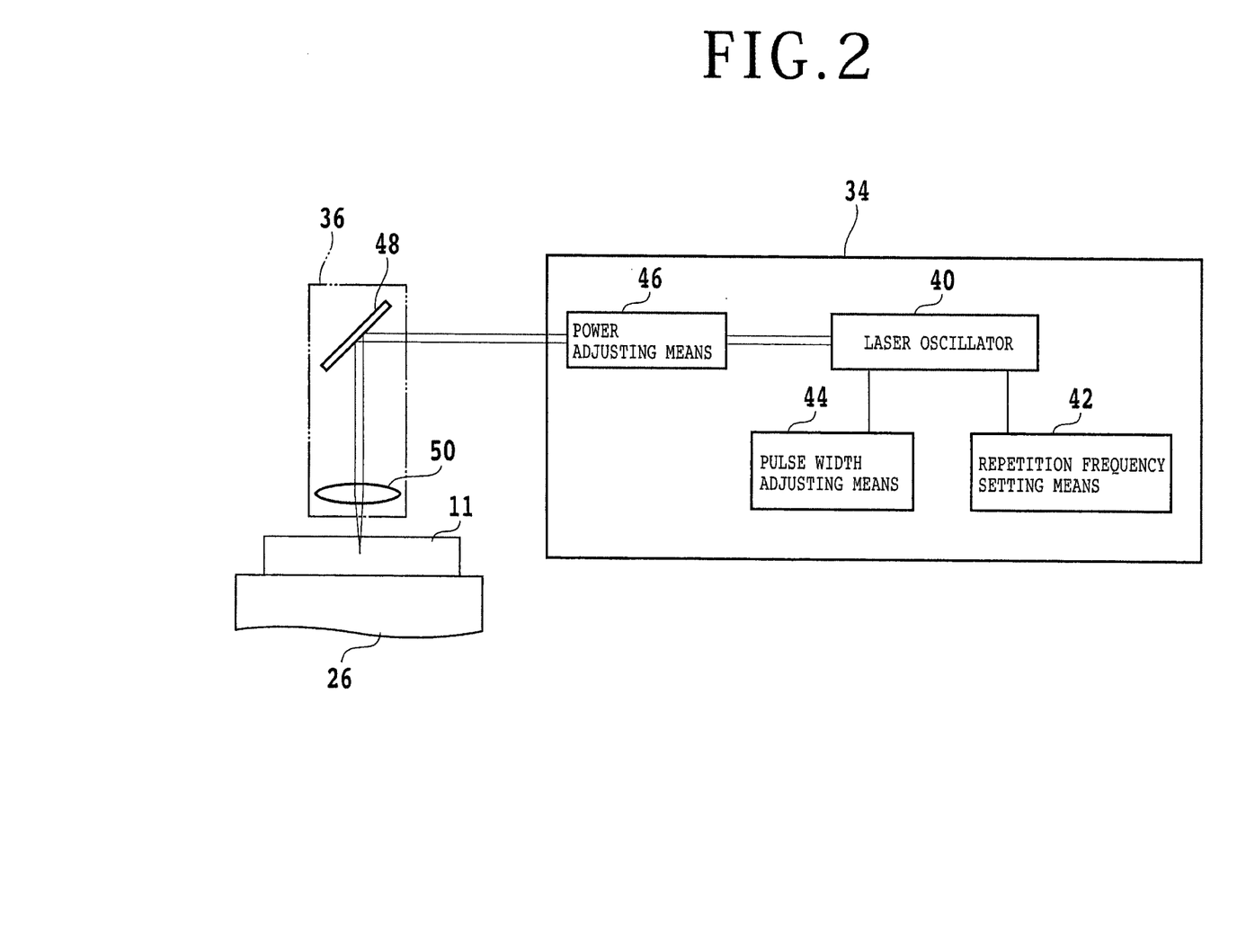
FIG. 2 is a block diagram of a laser beam generating unit.

As shown in FIG. 2, the laser beam generating unit 34 includes a laser oscillator 40 for generating a pulsed laser beam such as yttrium aluminum garnet (YAG) laser and yttrium vanadium-tetroxide (YVO4) laser, repetition frequency setting means 42 for setting the repetition frequency of the pulsed laser beam to be generated by the laser oscillator 40, pulse width adjusting means 44 for adjusting the pulse width of the pulsed laser beam to be generated by the laser oscillator 40, and power adjusting means 46 for adjusting the power of the pulsed laser beam generated by the laser oscillator 40. Although especially not shown, the laser oscillator 40 has a Brewster window, so that the laser beam generated from the laser oscillator 40 is a laser beam of linearly polarized light.

After the power of the pulsed laser beam is adjusted to a predetermined power by the power adjusting means 46 of the laser beam generating unit 34, the pulsed laser beam is reflected by a mirror 48 included in the focusing means 36 and next focused by a focusing lens 50 included in the focusing means 36. The focusing lens 50 is positioned so that the pulsed laser beam is focused inside an SiC ingot 11 as a workpiece fixed to the support table 26.

Figure 3A:
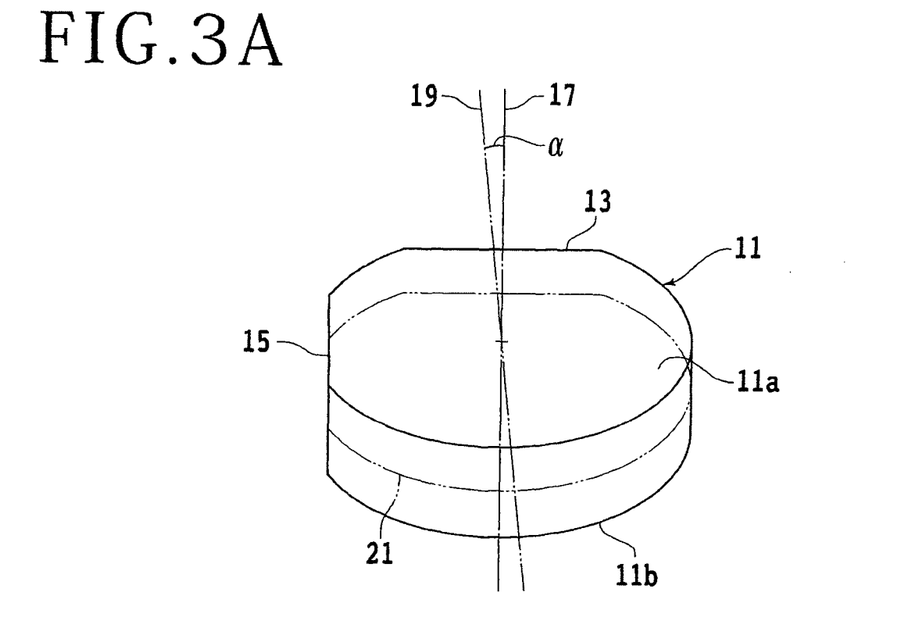
FIG. 3A is a perspective view of an SiC ingot.
Figure 3B:
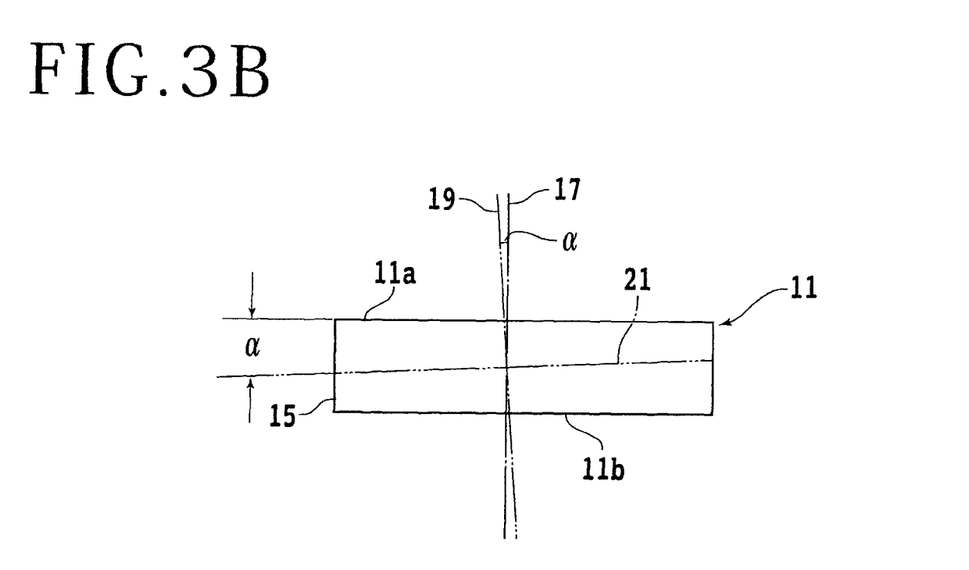
FIG. 3B is an elevational view of the SiC ingot shown in FIG. 3A.

Referring to FIG. 3A, there is shown a perspective view of the SiC ingot (which will be hereinafter referred to also simply as ingot) 11 as a workpiece to be processed. FIG. 3B is an elevational view of the SiC ingot 11 shown in FIG. 3A. The ingot 11 has a first surface (upper surface) 11a and a second surface (lower surface) 11b opposite to the first surface 11a. The upper surface 11a of the ingot 11 is preliminarily polished to a mirror finish because the laser beam is applied to the first surface 11a.

The ingot 11 has a first orientation flat 13 and a second orientation flat 15 perpendicular to the first orientation flat 13. The length of the first orientation flat 13 is set longer than the length of the second orientation flat 15.

The ingot 11 has a c-axis 19 inclined by an off angle α toward the second orientation flat 15 with respect to a normal 17 to the upper surface 11a and also has a c-plane 21 perpendicular to the c-axis 19. The c-plane 21 is inclined by the off angle α with respect to the upper surface 11a of the ingot 11. In general, in the SiC ingot 11, the direction perpendicular to the direction of extension of the shorter second orientation flat 15 is the direction of inclination of the c-axis.

The c-plane 21 is set in the ingot 11 innumerably at the molecular level of the ingot 11. In the preferred embodiment, the off angle α is set to 4°. However, the off angle α is not limited to 4° in the present invention. For example, the off angle α may be freely set in the range of 1° to 6° in manufacturing the ingot 11.

Referring again to FIG. 1, a column 52 is fixed to the left side of the stationary base 4. The column 52 is formed with a vertically elongated opening 53, and a pressing mechanism 54 is vertically movably mounted to the column 52 so as to project from the opening 53.

Figure 4:
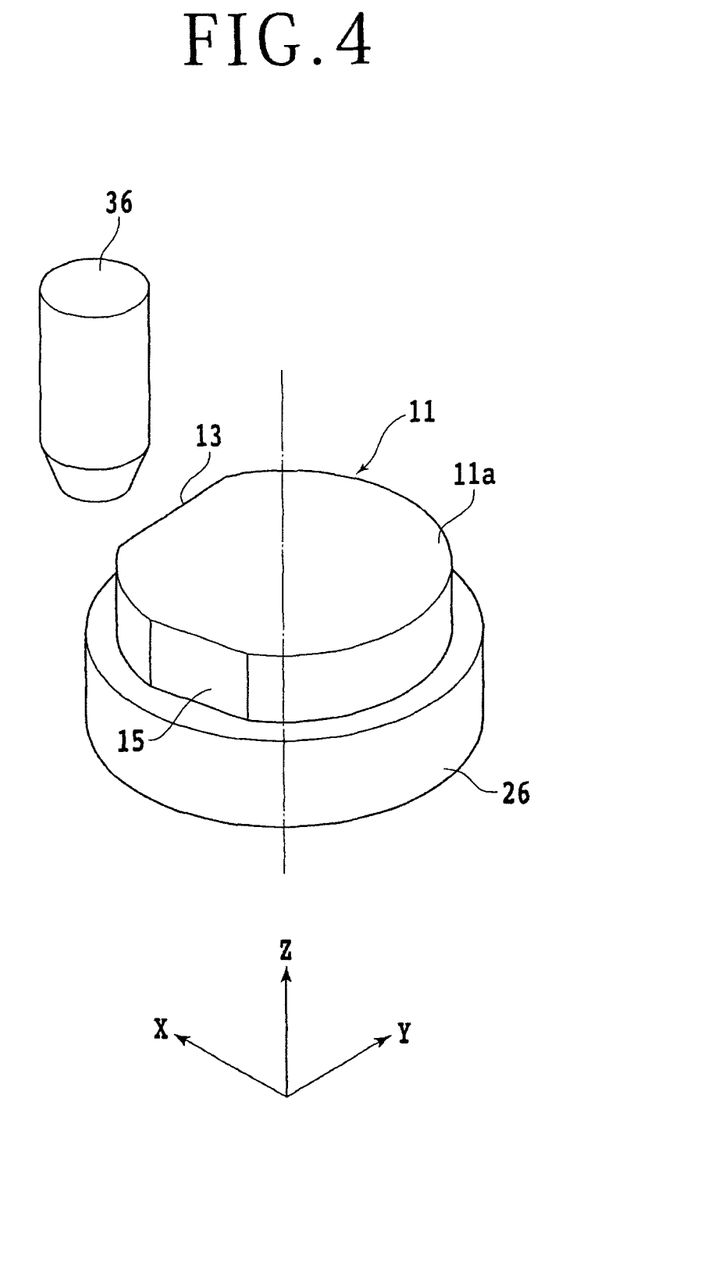
FIG. 4 is a perspective view for illustrating a separation start point forming step.
Figure 5:
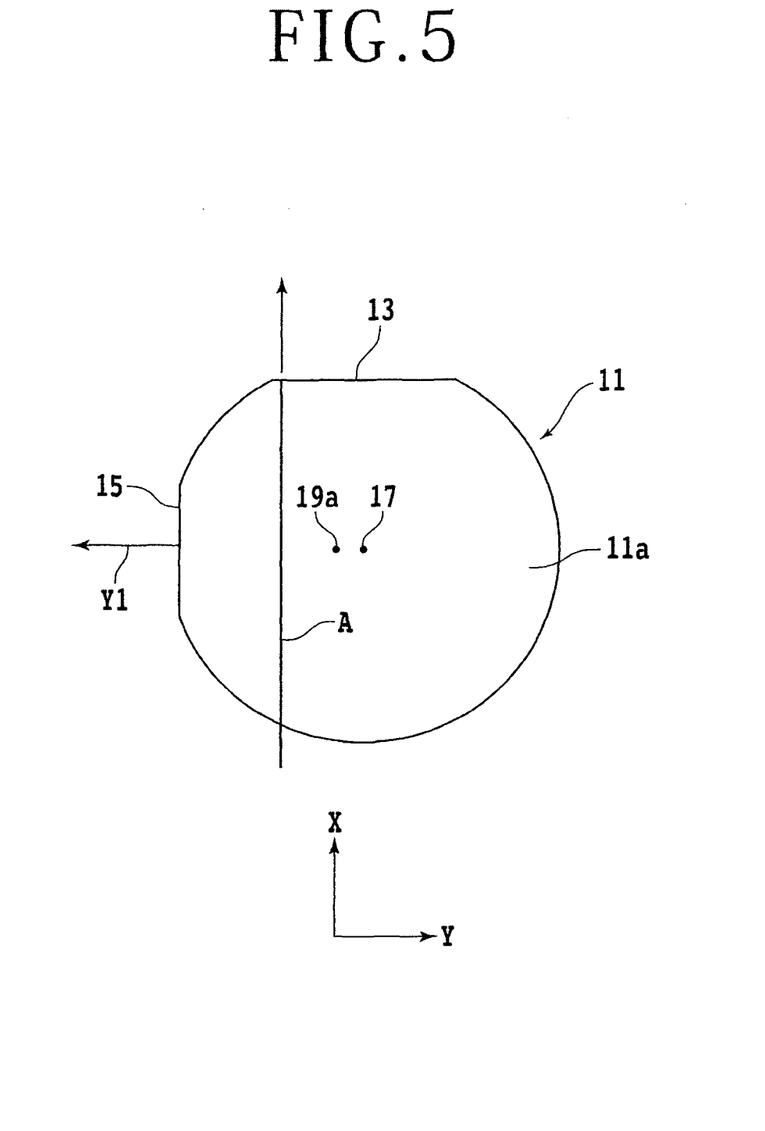
FIG. 5 is a plan view of the SiC ingot shown in FIG. 3A.

As shown in FIG. 4, the ingot 11 is fixed to the upper surface of the support table 26 by using a wax or adhesive in the condition where the second orientation flat 15 of the ingot 11 becomes parallel to the X direction. In other words, as shown in FIG. 5, the direction of formation of the off angle α is shown by an arrow Y1. That is, the direction of the arrow Y1 is the direction where the intersection 19a between the c-axis 19 and the upper surface 11a of the ingot 11 is present with respect to the normal 17 to the upper surface 11a of the ingot 11. Further, the direction perpendicular to the direction of the arrow Y1 is shown by an arrow A. Then, the ingot 11 is fixed to the support table 26 in the condition where the direction of the arrow A becomes parallel to the X direction. Accordingly, the laser beam is scanned in the direction of the arrow A perpendicular to the direction of the arrow Y1, or perpendicular to the direction of formation of the off angle α. In other words, the direction of the arrow A perpendicular to the direction of the arrow Y1 where the off angle α is formed is defined as the feeding direction of the support table 26.

In the SiC wafer producing method of the present invention, it is important that the scanning direction of the laser beam to be applied from the focusing means 36 is set to the direction of the arrow A perpendicular to the direction of the arrow Y1 where the off angle α of the ingot 11 is formed. That is, it was found that by setting the scanning direction of the laser beam to the direction of the arrow A as mentioned above in the SiC wafer producing method of the present invention, cracks propagating from a modified layer formed inside the ingot 11 by the laser beam extend very long along the c-plane 21.

In performing the SiC wafer producing method according to the preferred embodiment, a separation start point forming step is performed in such a manner that the focal point of the laser beam having a transmission wavelength (e.g., 1064 nm) to the SiC ingot 11 fixed to the support table 26 is set inside the ingot 11 at a predetermined depth from the first surface (upper surface) 11a, which depth corresponds to the thickness of an SiC wafer to be produced, and the laser beam is next applied to the upper surface 11a as relatively moving the focal point and the SiC ingot 11 to thereby form a modified layer 23 parallel to the upper surface 11a and cracks 25 propagating from the modified layer 23 along the c-plane 21, thus forming a separation start point.

Figure 7:
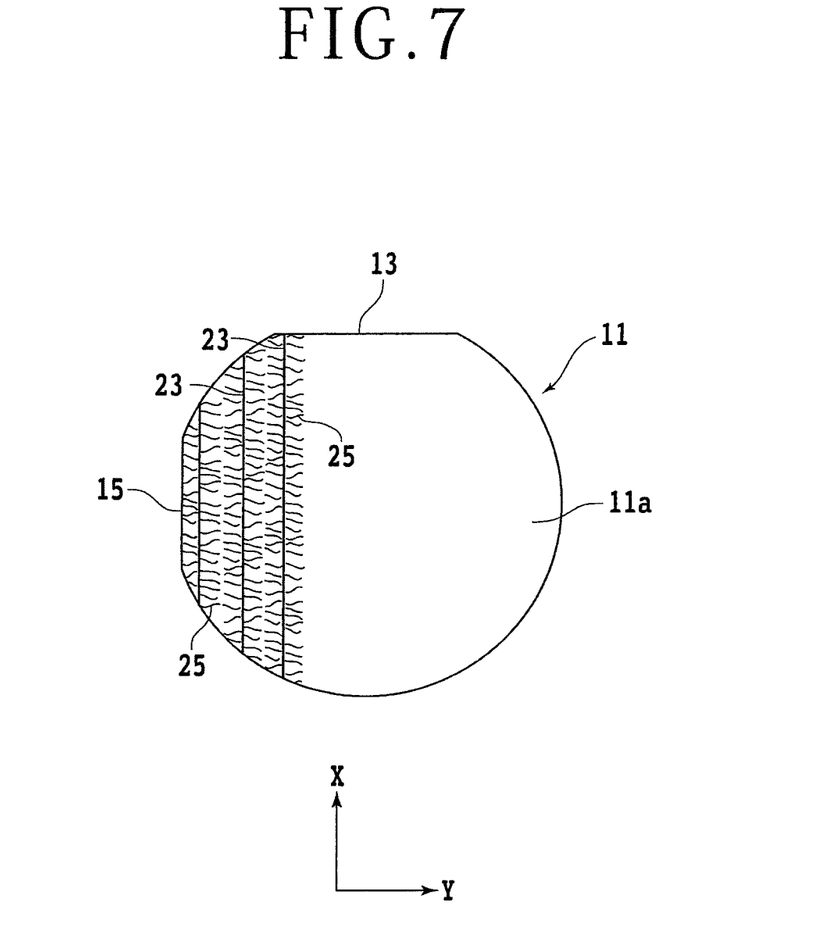
FIG. 7 is a schematic plan view for illustrating the modified layer forming step.
Figure 8A:
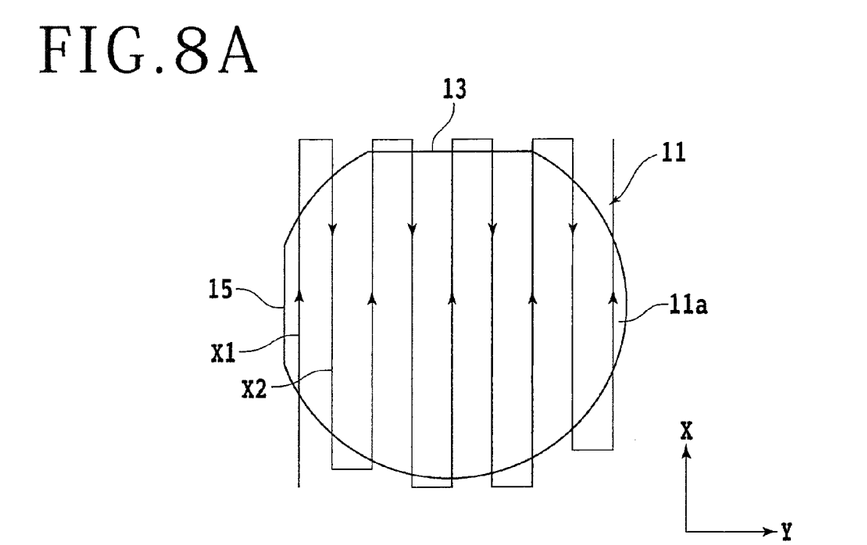
FIG. 8A is a schematic plan view for illustrating an indexing step.
Figure 8B:
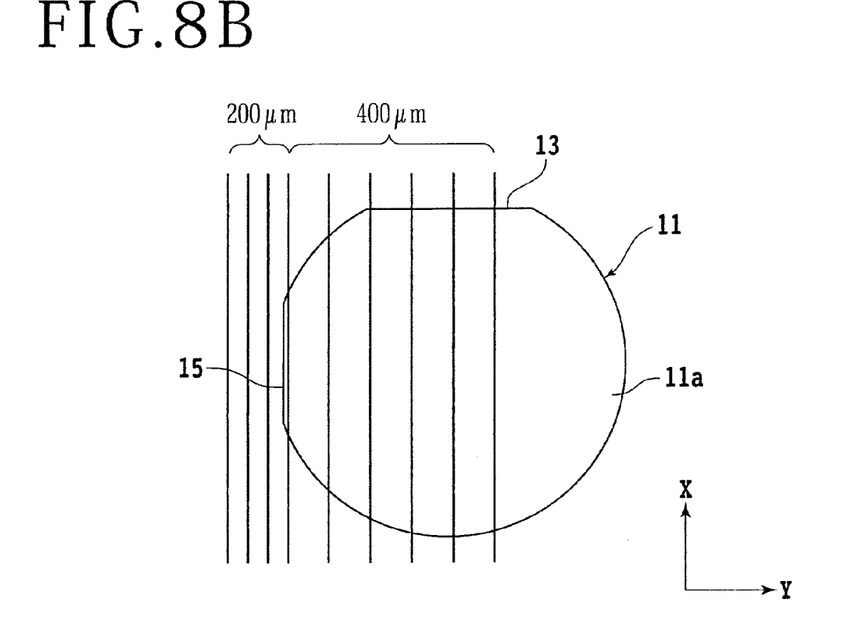
FIG. 8B is a schematic plan view for illustrating an index amount.

This separation start point forming step includes a modified layer forming step of relatively moving the focal point of the laser beam in the direction of the arrow A perpendicular to the direction of the arrow Y1 shown in FIG. 5, where the c-axis 19 is inclined by the off angle α with respect to the normal 17 to the upper surface 11a and the off angle α is formed between the c-plane 21 and the upper surface 11a, thereby linearly forming the modified layer 23 inside the ingot 11 and the cracks 25 propagating from the modified layer 23 along the c-plane 21, and also includes an indexing step of relatively moving the focal point in the direction of formation of the off angle α, i.e., in the Y direction to thereby index the focal point by a predetermined amount as shown in FIG. 7 and FIGS. 8A and 8B.

Figure 6:
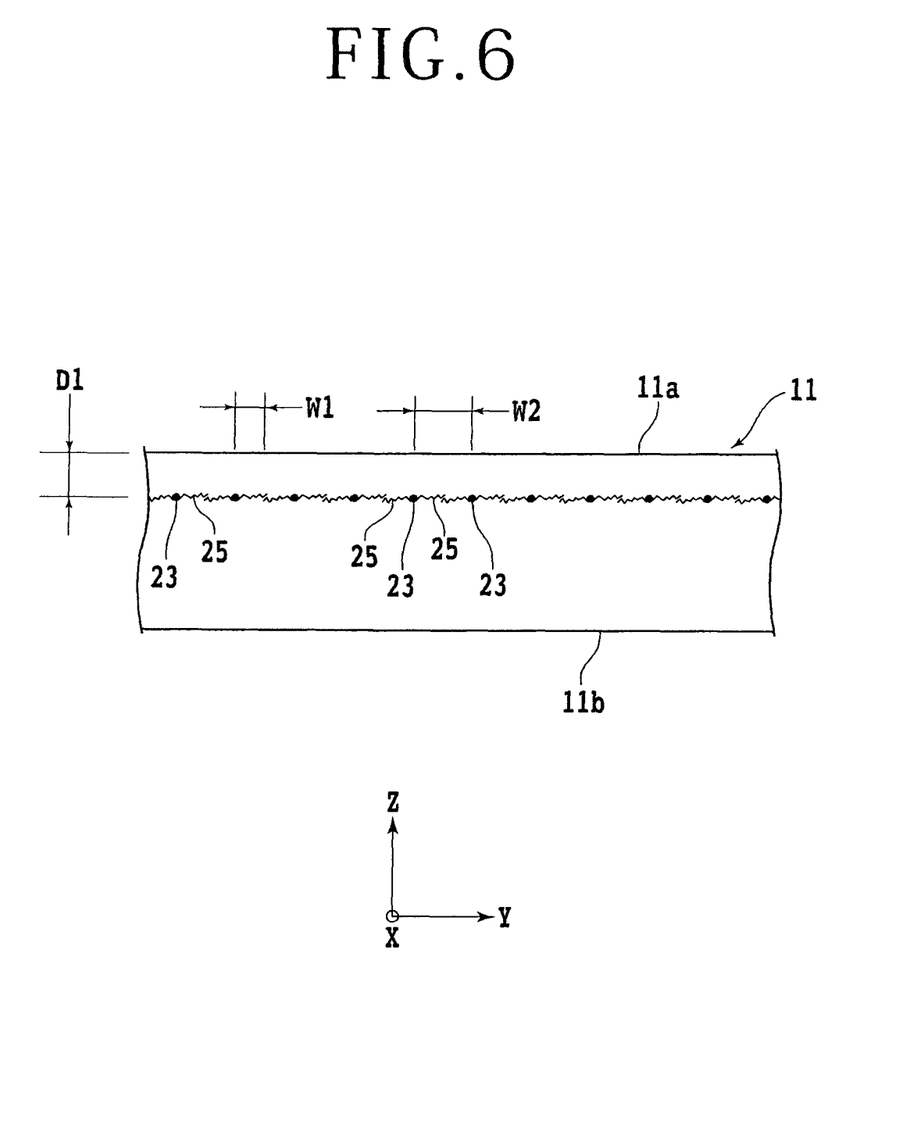
FIG. 6 is a schematic sectional view for illustrating a modified layer forming step.

As shown in FIGS. 6 and 7, the modified layer 23 is linearly formed so as to extend in the X direction, so that the cracks 25 propagate from the modified layer 23 in opposite directions along the c-plane 21. In the SiC wafer producing method according to the preferred embodiment, the separation start point forming step further includes an index amount setting step of measuring the width of the cracks 25 formed on one side of the modified layer 23 along the c-plane 21 and then setting the index amount of the focal point according to the width measured above.

More specifically, letting W1 denote the width of the cracks 25 formed on one side of the modified layer 23 so as to propagate from the modified layer 23 along the c-plane 21, the index amount W2 of the focal point is set in the range of W1 to 2W1.

For example, the modified layer forming step is performed under the following laser processing conditions.

Light source: neodymium (Nd):YAG pulsed laser
Wavelength: 1064 nm
Repetition frequency: 80 kHz
Average power: 3.2 W
Pulse width: 4 ns
Spot diameter: 10 μm
Numerical aperture (NA) of the focusing lens: 0.45
Index amount: 400 μm In the laser processing conditions mentioned above, the width W1 of the cracks 25 propagating from the modified layer 23 along the c-plane 21 in one direction as viewed in FIG. 6 is set to approximately 250 μm, and the index amount W2 is set to 400 μm. However, the average power of the laser beam is not limited to 3.2 W. When the average power of the laser beam was set to 2 to 4.5 W, good results were obtained in the preferred embodiment. In the case that the average power was set to 2 W, the width W1 of the cracks 25 was approximately 100 μm. In the case that the average power was set to 4.5 W, the width W1 of the cracks 25 was approximately 350 μm.

In the case that the average power is less than 2 W or greater than 4.5 W, the modified layer 23 cannot be well formed inside the ingot 11. Accordingly, the average power of the laser beam to be applied is preferably set in the range of 2 to 4.5 W. For example, the average power of the laser beam to be applied to the ingot 11 was set to 3.2 W in the preferred embodiment. As shown in FIG. 6, the depth D1 of the focal point from the upper surface 11a in forming the modified layer 23 was set to 500 μm.

Referring to FIG. 8A, there is shown a schematic plan view for illustrating the scanning direction of the laser beam. The separation start point forming step is performed on a forward path X1 and a backward path X2 as shown in FIG.

8A. That is, the modified layer 23 is formed in the SiC ingot 11 on the forward path X1. Thereafter, the focal point of the laser beam is indexed by the predetermined amount. Thereafter, the modified layer 23 is formed again in the SiC ingot 11 on the backward path X2.

Further, in the case that the index amount of the focal point of the laser beam is set in the range of W to 2 W where W is the width of the cracks 25 formed on one side of the modified layer 23 along the c-plane 21, the index amount of the focal point is preferably set to W or less until the modified layer 23 is first formed after setting the focal point of the laser beam inside the SiC ingot 11.

For example, in the case that the index amount of the focal point of the laser beam is 400 μm, the index amount is set to 200 μm until the modified layer 23 is first formed inside the ingot 11, and the laser beam is scanned plural times with this index amount of 200 μm as shown in FIG. 8B. That is, a first part of the plural scanning paths of the laser beam is idle, and when it is determined that the modified layer 23 has been first formed inside the ingot 11, the index amount is set to 400 μm and the modified layer 23 is then formed inside the ingot 11.

The modified layer forming step according to the preferred embodiment will now be described in more detail with reference to FIGS. 9 and 10. In the modified layer forming step, the $M^2$ factor of the laser beam is set in a suitable range, thereby allowing the formation of a modified layer having a relatively large diameter by the use of a focusing lens having a shallow depth of focus. The $M^2$ factor is a factor indicating the quality of the laser beam in a lateral mode. This factor is a value indicating the degree of difference of the actual laser beam from an ideal TEM00 Gaussian beam. In the case of the Gaussian beam, $M^2=1$.

Letting d denotes the spot diameter of the laser beam to be focused by the focusing lens 50, λ denotes the wavelength of the laser beam, and NA denotes the numerical aperture of the focusing lens 50, the following relation holds.

$$d=1.22(\lambda/NA) \quad (1)$$

For example, in the case that λ=1064 nm and NA=0.45, d=2.88 μm.

In the modified layer forming step according to the preferred embodiment, the depth of focus of the focusing lens 50 is made relatively shallow. Accordingly, the focusing lens 50 having a numerical aperture NA of 0.45 to 0.9 is used. In the case of using this focusing lens 50 to set the diameter of the focal point 62 of the laser beam LB to 15 to 150 μm, the $M^2$ factor of the laser beam LB was calculated to obtain $M^2$=5 to 50.

The $M^2$ factor of such a large value is considerably different from the $M^2$ factor of the ideal Gaussian beam. That is, it can be said that the quality of the laser beam LB is considerably low. More specifically, it can be said that the laser beam LB to be used in the modified layer forming step according to the preferred embodiment has a considerably low quality.

Figure 9:
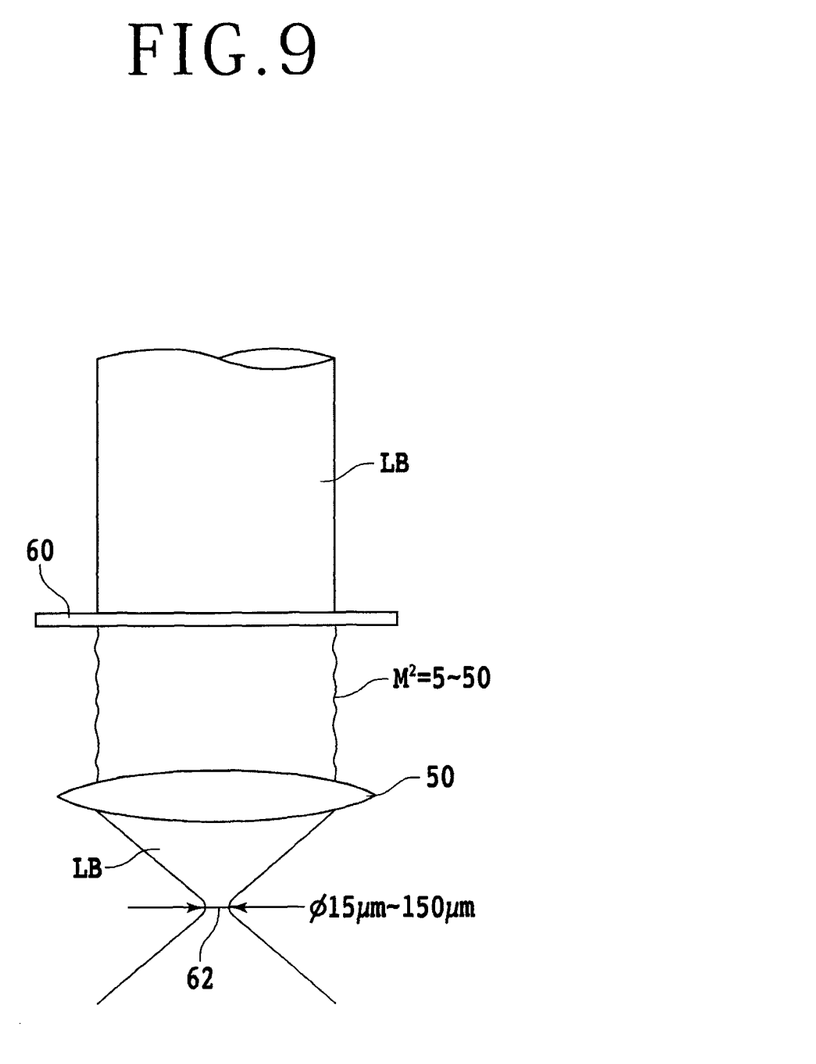
FIG. 9 is a schematic view for illustrating the relation between the $M^2$ factor of a laser beam to be applied in the modified layer forming step and a focal spot to be formed by a focusing lens.

In the preferred embodiment shown in FIG. 9, a ground glass 60 is provided on the upper side (upstream side) of the focusing lens 50 to thereby substantially set the $M^2$ factor of the laser beam LB to 5 to 50.

The $M^2$ factor of the laser beam LB is substantially set to 5 to 50 by the following method.

(1) A laser oscillator having an $M^2$ factor of 5 to 50 is used.

(2) As shown in FIG. 9, the ground glass 60 is provided on the upper side of the focusing lens 50 to substantially set the $M^2$ factor of the laser beam to 5 to 50.

(3) A phase modulator is provided in place of the ground glass 60 on the upper side of the focusing lens 50 to substantially set the $M^2$ factor of the laser beam to 5 to 50.

(4) A diffraction grating (diffractive optical element (DOE)) is provided before the focusing lens 50 to branch the laser beam into multiple paths and substantially set the $M^2$ factor of the laser beam to 5 to 50.

(5) The focusing lens 50 capable of substantially setting the $M^2$ factor of the laser beam 5 to 50 is used.

(6) The laser beam is input into a multimode fiber to set the $M^2$ factor of the laser beam to be output from the multimode fiber to 5 to 50.

Figure 10:
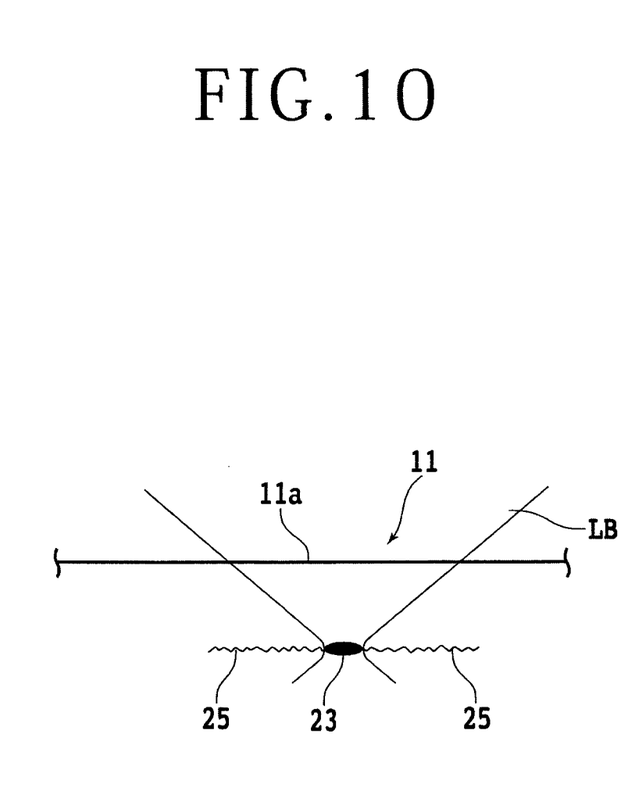
FIG. 10 is a schematic view for illustrating the modified layer forming step in which the $M^2$ factor is set to a relatively large value to thereby allow the formation of a modified layer having a relatively large area by the use of a focusing lens having a shallow depth of focus.

Referring to FIG. 10, there is shown a schematic view in forming the modified layer 23 by using the focusing lens 50 having a numerical aperture NA of 0.45 to 0.9 and a relatively shallow depth of focus and substantially setting the $M^2$ factor of the laser beam LB to 5 to 50. Since the diameter of the focal point 62 becomes 15 to 150 μm as shown in FIG. 9, the modified layer 23 having a relatively large area and the cracks 25 propagating from the modified layer 23 are formed as shown in FIG. 10.

A main object of the modified layer forming step according to the preferred embodiment is to form the modified layer 23 having a relatively large area. Accordingly, this modified layer forming step is applicable also to the laser beam applying method as described in Japanese Patent Laid-open No. 2013-49461. That is, the modified layer forming step in the present invention is not limited to the modified layer forming step of relatively moving the focal point of the laser beam in a first direction perpendicular to a second direction where the c-axis is inclined by an off angle with respect to a normal to the first surface of the ingot 11 and the off angle is formed between the first surface and the c-plane, but applicable also to a modified layer forming step having no relation to the c-axis and the c-plane.

In the modified layer forming step according to the preferred embodiment, the numerical aperture NA of the focusing lens 50 is set to 0.45 to 0.9, and the $M^2$ factor of the laser beam LB is substantially set to 5 to 50, so that the diameter of the focal point can be set to 15 to 150 μm. Accordingly, the modified layer 23 having a relatively large area can be formed, so that the separation start point composed of the modified layer 23 and the cracks 25 can be efficiently formed inside the SiC ingot 11.

An optimum power density at the focal point 62 will now be considered. Under the conditions that the diameter of the focal point 62 was set to 3 μm, the average power of the laser beam was set to 3 W, and the repetition frequency of the laser beam was set to 80 kHz, the focal point 62 was set at a depth of 500 μm from the upper surface 11a of the ingot 11, and the laser beam was applied to the ingot 11 as moving the focal point at a feed speed of 40 mm/second to thereby form the modified layer 23. Then, the locus of the modified layer 23 was analyzed.

Initially, the modified layer 23 was formed at the depth of 500 μm. However, the modified layer 23 was gradually raised in position so as to describe a parabola. After 100 pulses of shots of the laser beam were applied, the depth of the modified layer 23 became stable to 400 μm and the modified layer 23 was formed horizontally. This is assumed to be due to the following fact. Initially, the modified layer 23 is formed at the focal point where the power density is highest. Thereafter, carbon (C) is deposited at the upper portion of the modified layer 23, and the laser beam continuously applied is absorbed by this carbon. Thereafter, the modified layer 23 is formed so as to rise in the carbon region in a chained manner. Thereafter, the formation of the modified layer 23 becomes stable at the critical point of the power density.

At the critical point, the diameter of the focal point 62 is 41.5 μm and the power density is $2.2 \times 10^5$ W/cm$^2$. The experiment was repeated to find that the modified layer 23 was stably formed at a power density of $(2 \text{ to } 3) \times 10^5$ W/cm$^2$. Accordingly, in the modified layer forming step according to the preferred embodiment, the power density at the focal point 62 was set to $(2 \text{ to } 3) \times 10^5$ W/cm$^2$.

Figure 12:
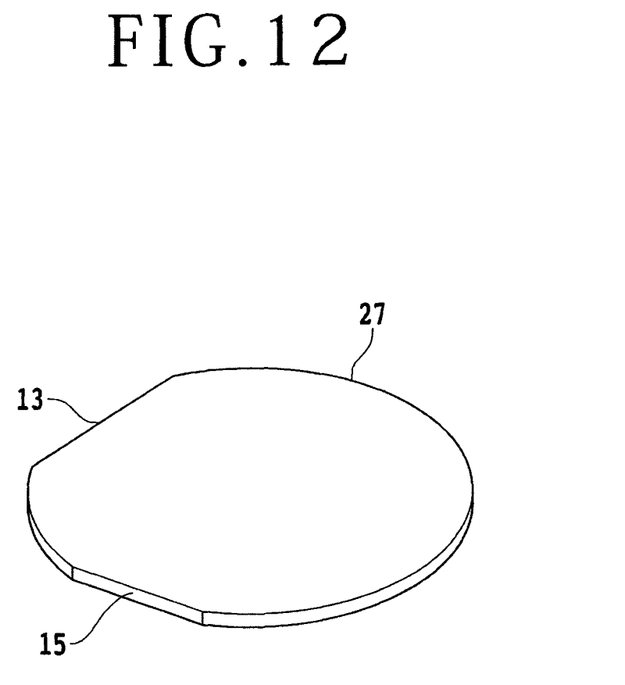
FIG. 12 is a perspective view of an SiC wafer produced from the SiC ingot.

In this manner, the focal point of the laser beam is sequentially indexed to form a plurality of modified layers 23 at the depth D1 in the whole area of the ingot 11 and the cracks 25 extending from each modified layer 23 along the c-plane 21 as shown in FIG. 6. Thereafter, a wafer separating step is performed in such a manner that an external force is applied to the SiC ingot 11 to thereby separate a plate-shaped member having a thickness corresponding to the thickness of the wafer to be formed from the ingot 11 at the separation start point composed of the modified layers 23 and the cracks 25, thus producing an SiC wafer 27 shown in FIG. 12.

Figure 11A:
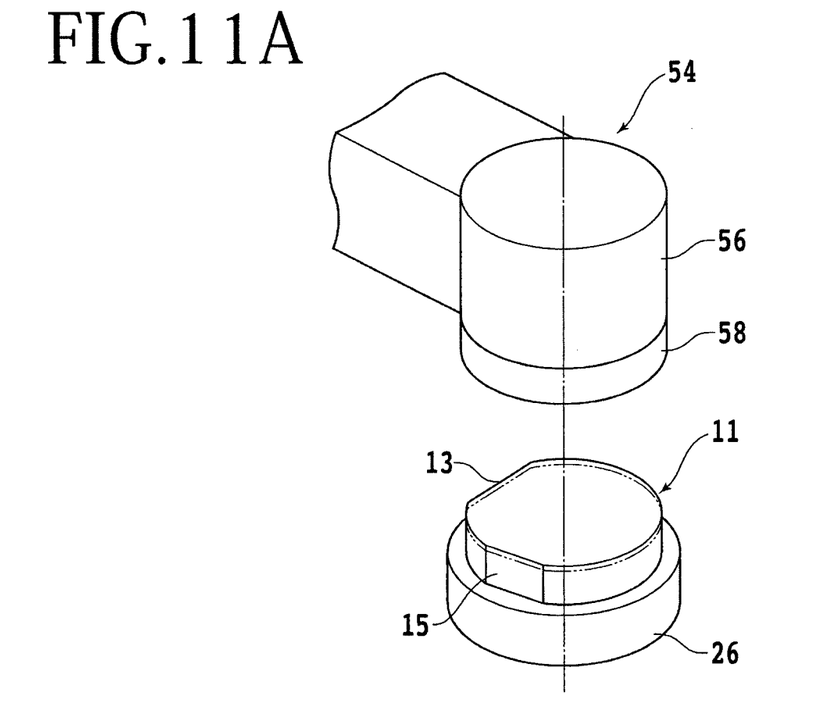
FIGS. 11A and 11B are perspective views for illustrating a wafer separating step.
Figure 11B:
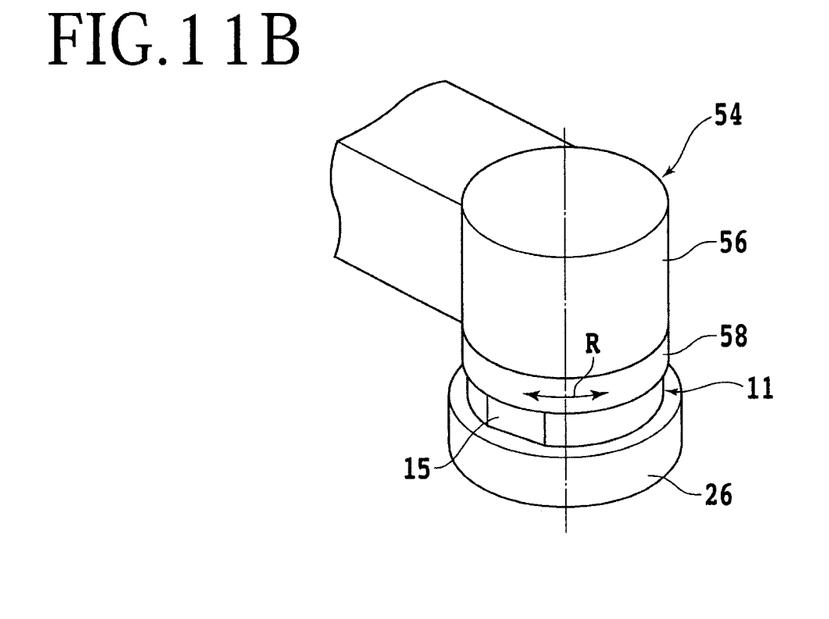

This wafer separating step is performed by using the pressing mechanism 54 shown in FIG. 1. The configuration of the pressing mechanism 54 is shown in FIGS. 11A and 11B. The pressing mechanism 54 includes a head 56 vertically movable by a moving mechanism (not shown) incorporated in the column 52 shown in FIG. 1 and a pressing member 58 rotatable in the direction shown by an arrow R in FIG. 11B with respect to the head 56. As shown in FIG. 11A, the pressing mechanism 54 is relatively positioned above the ingot 11 fixed to the support table 26. Thereafter, as shown in FIG. 11B, the head 56 is lowered until the pressing member 58 comes into pressure contact with the upper surface 11a of the ingot 11.

In the condition where the pressing member 58 is in pressure contact with the upper surface 11a of the ingot 11, the pressing member 58 is rotated in the direction of the arrow R to thereby generate a torsional stress in the ingot 11. As a result, the ingot 11 is broken at the separation start point where the modified layers 23 and the cracks 25 are formed. Accordingly, the SiC wafer 27 shown in FIG. 12 can be separated from the SiC ingot 11. After separating the SiC wafer 27 from the SiC ingot 11, the separation surface of the SiC wafer 27 and the separation surface of the SiC ingot 11 are preferably polished to a mirror finish.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. An SiC wafer producing method for producing an SiC wafer from an SiC ingot having an end surface, comprising:
   a separation start point forming step of setting a focal point of a laser beam having a transmission wavelength to the SiC ingot inside the SiC ingot at a predetermined depth from the end surface, which depth corresponds to the thickness of the SiC wafer to be produced, and next applying the laser beam to the end surface of the SiC ingot as relatively moving the focal point of the laser beam and the SiC ingot to thereby form a modified layer parallel to the end surface and cracks extending from the modified layer, thus forming a separation start point; and
   a wafer separating step of separating a plate-shaped member having a thickness corresponding to the thickness of the SiC wafer from the SiC ingot at the separation start point after performing the separation start point forming step, thus producing the SiC wafer from the SiC ingot;
   the separation start point forming step including the steps of setting the numerical aperture of a focusing lens for forming the focal point to 0.45 to 0.9 and substantially setting the M$^2$ factor of the laser beam to 5 to 50 to thereby set the diameter of the focal point to 15 to 150 μm.

2. The SiC wafer producing method according to claim 1, wherein the power density at the focal point is set to $(2 \text{ to } 3) \times 10^5$ W/cm$^2$.

3. An SiC wafer producing method for producing an SiC wafer from an SiC ingot having a first surface, a second surface opposite to the first surface, a c-axis extending from the first surface to the second surface, and a c-plane perpendicular to the c-axis, the SiC wafer producing method comprising:
   a separation start point forming step of setting a focal point of a laser beam having a transmission wavelength to the SiC ingot inside the SiC ingot at a predetermined depth from the first surface, which depth corresponds to the thickness of the SiC wafer to be produced, and next applying the laser beam to the first surface as relatively moving the focal point of the laser beam and the SiC ingot to thereby form a modified layer parallel to the first surface and cracks extending from the modified layer along the c-plane, thus forming a separation start point; and
   a wafer separating step of separating a plate-shaped member having a thickness corresponding to the thickness of the SiC wafer from the SiC ingot at the separation start point after performing the separation start point forming step, thus producing the SiC wafer from the SiC ingot;
   the separation start point forming step including:
      a modified layer forming step of relatively moving the focal point of the laser beam in a first direction perpendicular to a second direction where the c-axis is inclined by an off angle with respect to a normal to the first surface and the off angle is formed between the first surface and the c-plane, thereby linearly forming the modified layer extending in the first direction; and
      an indexing step of relatively moving the focal point in the second direction to thereby index the focal point by a predetermined amount;
   the modified layer forming step including the steps of setting the numerical aperture of a focusing lens for forming the focal point to 0.45 to 0.9 and substantially setting the M$^2$ factor of the laser beam to 5 to 50 to thereby set the diameter of the focal point to 15 to 150 μm.

* * * * *